United States Patent
Gantner et al.

[11] Patent Number: 5,647,563
[45] Date of Patent: Jul. 15, 1997

[54] PIPE CLAMP LOCK

[75] Inventors: Gebhard Gantner, Nenzing; Franz Dengg, Saarbrücken; Peter Ofner, Feldkirch, all of Austria; Herbert Münzenberger, Wiesbaden, Germany

[73] Assignee: Hilti Aktiengesellschaft, Furstentum, Liechtenstein

[21] Appl. No.: 399,797

[22] Filed: Mar. 7, 1995

[30] Foreign Application Priority Data

Mar. 31, 1994 [DE] Germany ............ 44 11 221.1

[51] Int. Cl.$^6$ ............................................ F16L 3/08
[52] U.S. Cl. ................. 248/74.1; 24/20 EE; 24/23 EE
[58] Field of Search ........................ 248/74.1, 74.2, 248/74.3, 62, 65; 24/20 EE, 23 EE

[56] References Cited

U.S. PATENT DOCUMENTS

| 3,463,427 | 8/1969 | Fisher | 248/74.3 X |
| 4,712,278 | 12/1987 | Oetiker | 24/23 EE X |
| 5,138,746 | 8/1992 | Ojima et al. | 24/20 EE X |
| 5,203,809 | 4/1993 | Oetiker | 24/20 EE X |

FOREIGN PATENT DOCUMENTS 0461973  12/1991  France.

*Primary Examiner*—Derek J. Berger
*Attorney, Agent, or Firm*—Anderson, Kill & Olick P.C.

[57] ABSTRACT

A pipe clamp is formed of a pair of semicircular clamp halves, one having a first end region (1) and the other a second end region (2). First end region (1) has a radially outwardly extending projection (3) and two guides (6, 7) located along opposite sides. Second end region (2) has a circumferentially extending radially flexural locking strip (4) with a stop face (5) directed away from a free end of the second end region (2). In the closed position, the guides (6,7) of the first end region overlap at least a part of the second end region, so that the second end region is prevented from moving radially outwardly. In moving the first and second end regions into the closed position, the projection presses the locking strip radially outwardly until the projection (3) cooperates with the stop face (5) of the locking strip (4) in the closed position.

5 Claims, 3 Drawing Sheets

PIPE CLAMP LOCK

BACKGROUND OF THE INVENTION

The present invention is directed to a pipe clamp lock where the pipe clamp has a first end region and a second end region with a radially outwardly extending projection on an outside surface of the first end region. The radially outward dimension of the projection decreases towards a free end of the first end region. The second end region has a radially flexural locking strip with at least one stop face directed away from the free end of the second end region. The first and second end regions overlap in the circumferential direction.

In U.S. Pat. No. 2,374,541 a pipe clamp is disclosed where the first and second end regions overlap in the closed or locked position. At the same time, a projection extending radially outwardly from the first end region cooperates with a stop face on the second end region facing away from the free end of the second end region.

With certain movements of the pipe being supported, such as external mechanical action, the two overlapping end regions move apart in the radial direction, whereby the connection between the projection on the first end region and the stop face of the second end region is broken. Such an occurrence leads to opening of the pipe clamp with the pipes held by the pipe clamp dropping out.

SUMMARY OF THE INVENTION

Therefore, the primary object of the present invention is to provide a pipe clamp where radial displacement of the overlapping end region is prevented in the closed or locked position of the pipe clamp.

In accordance with the present invention, in the overlapping section, the first end region has a guide preventing any radially outward displacement of the second end region.

When closing the inventive pipe clamps, the first end region at least partially overlaps the outside surface of the second end region. As a result, the radial movement of the second end region in the outward direction is limited. If at this point the projection extending radially outwardly from the first end region bears against the radially flexural locking strip which is part of the second end region, then the locking strip is pressed radially outwardly, so that the projection can be moved beneath the locking strip. When the projection reaches the location of the stop face of the second end region directed away from the free end of the second end region, the locking strip flexes back into its original position.

Preferably, the first end region of the pipe clamp has two guides. In pipe clamps where the end regions overlap for a considerable extent, guides are arranged one after the other. On the contrary, pipe clamps of a great width have the guides located opposite one another. Expediently, the guides are arranged at the outer edges of the first end region for reasons of handling and also for improved accessibility as well as identification. Accordingly, the second end region can be directed in an improved manner into the guides of the first end region, particularly when closing or locking the pipe clamp.

To provide satisfactory displacement of the second end region along the radially outer surface of the first end region, the width or opening of the guide measured in the radial direction is preferably greater than the material thickness of the second end region. To afford good centering of the second end region in the guides of the first end region, the guides can be provided with an inlet bevel widening towards the free end of the first end region.

For simple and economic manufacture of the inventive pipe clamp, it is expedient if the guides are formed by bent parts of the first end region first projecting radially outwardly and then with the free ends bent inwardly to face one another. These bent parts are located at the outside surface of the first end region in the radial extension of the sides of the first end region. The largest inside dimension between the guides, extending parallel to a central axis of the pipe clamp, is slightly greater than the comparable width of the second end region.

To enable movement of the radially flexural locking strip, the spacing between the free ends of the bent parts or guides is preferably greater than the width of the radially flexural locking strip of the second end region.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
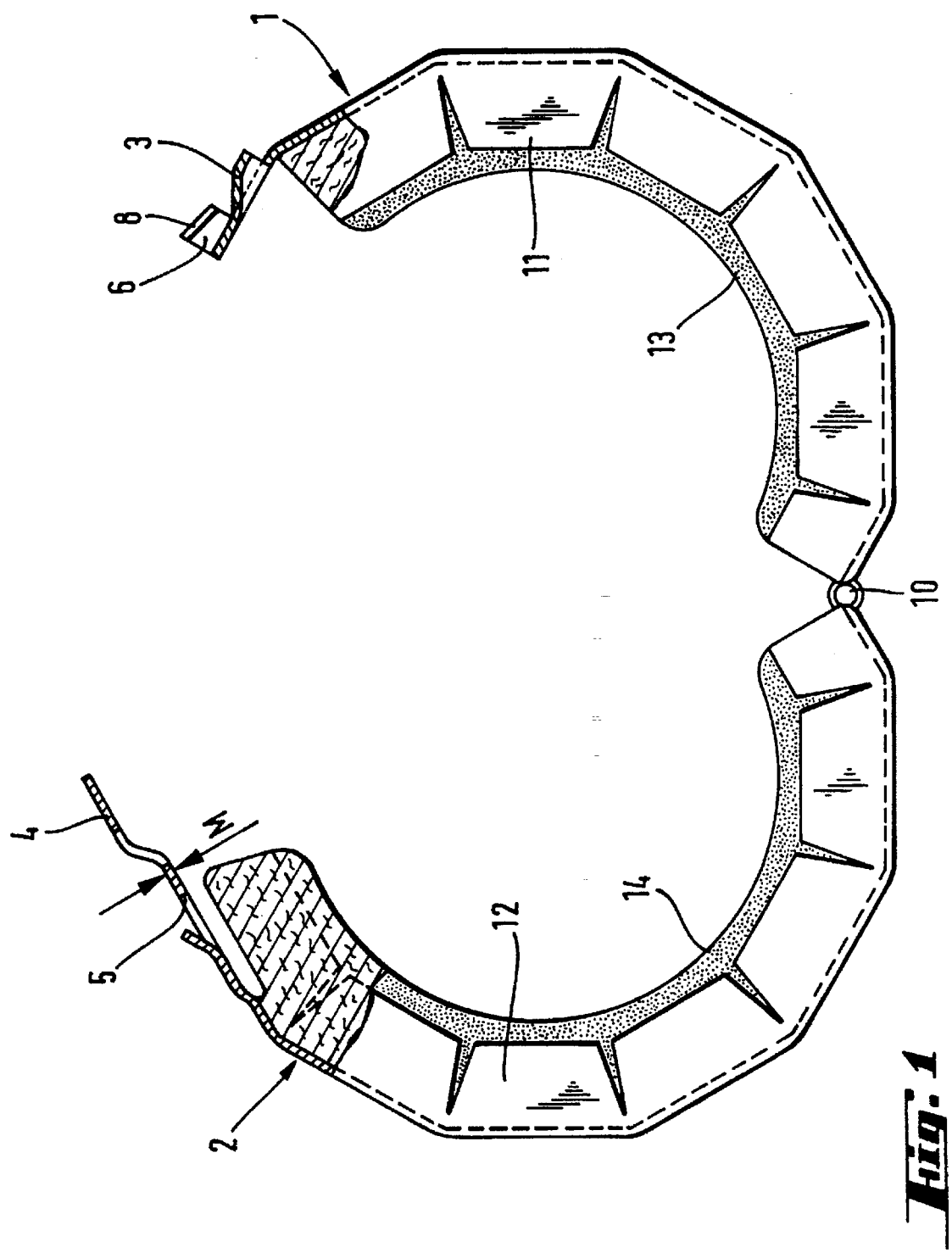
FIG. 1 is an end view of a pipe clamp, embodying the present invention, and shown in the open condition.
Figure 2:
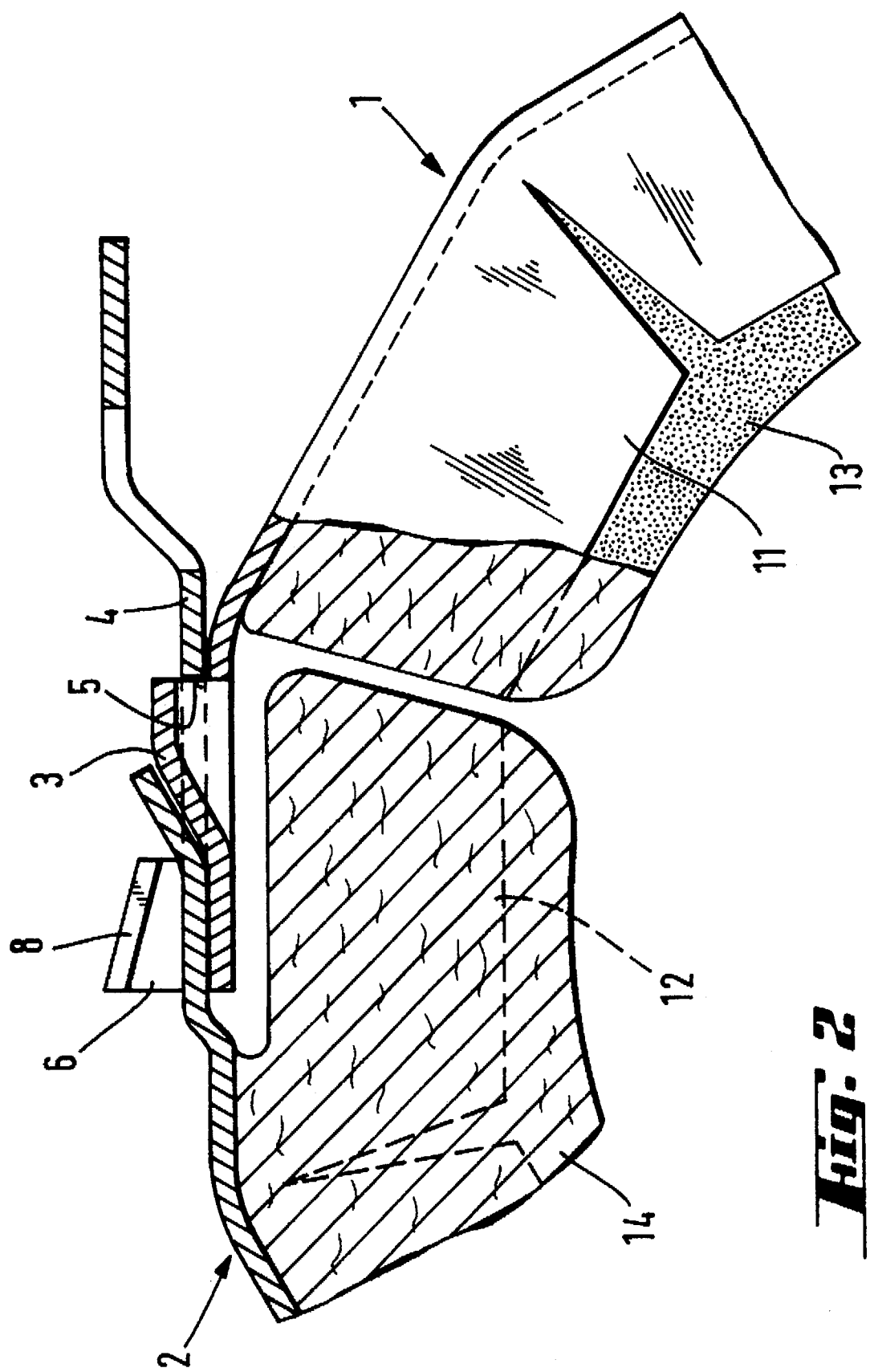
FIG. 2 is an enlarged partial view of the locking mechanism of the pipe clamp illustrated in FIG. 1 and shown in the closed or locked condition.
Figure 3:
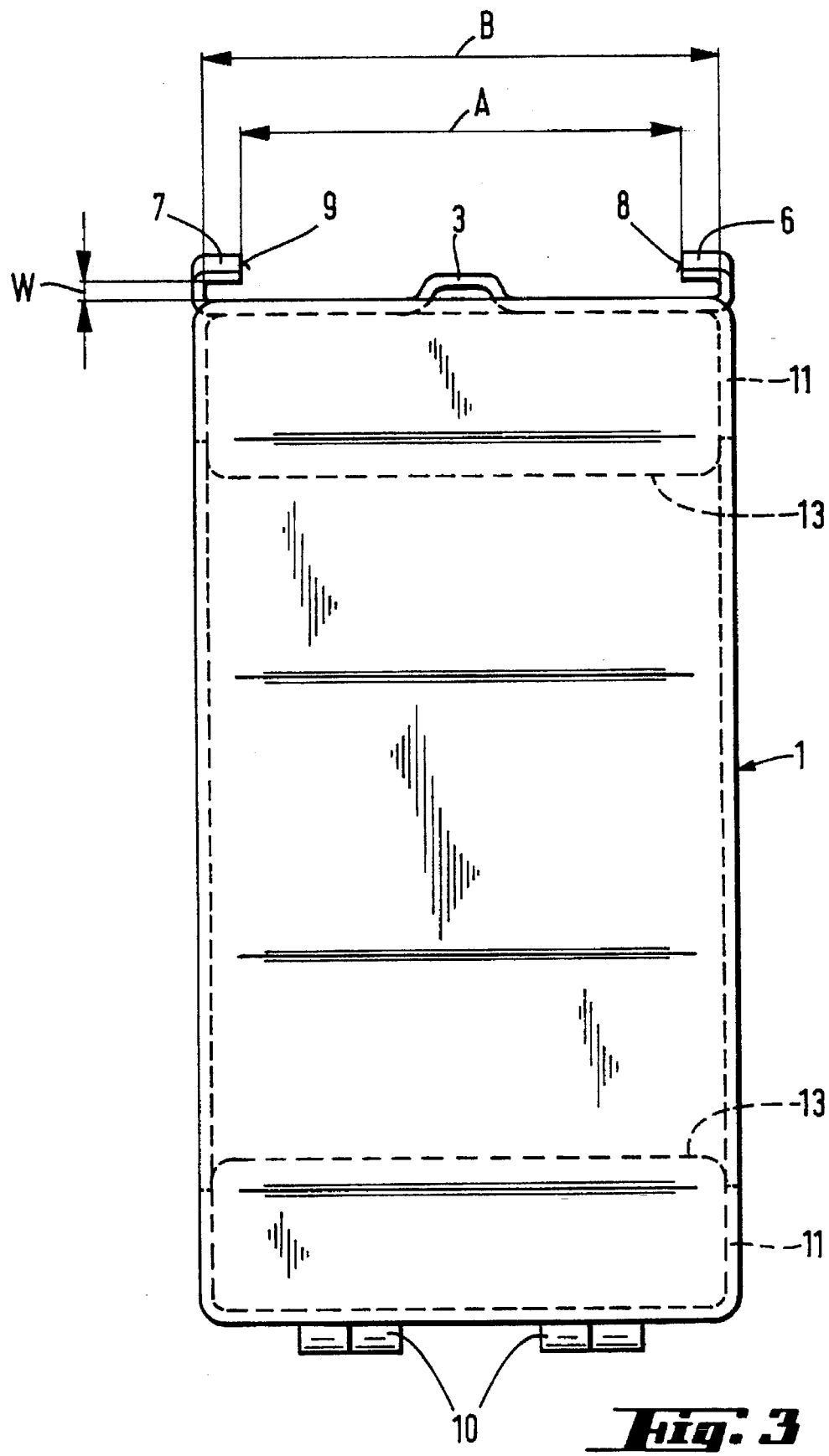
FIG. 3 is a side view of the first end region of the pipe clamp illustrated in FIG. 1.

In FIGS. 1 to 3 a pipe clamp is shown formed of two essentially semicircular clamp halves with a common pivot axis 10 at one end of each of the halves. As viewed in FIG. 1, the righthand clamp half has a first end region 1 at its opposite end from the pivot axis. The lefthand clamp half has a second end region 2 at the opposite end from the pivot axis 10 and the first and second end regions can be placed into overlapping engagement to form a locking mechanism. The first and second end regions 1, 2 are formed of shaped sheet metal strips with slotted side regions 11, 12 bent radially inwardly at 90° to the radially outer circumferential surfaces of the clamp halves. The radially inwardly extending side regions 11, 12 serve to retain linings 12, 13 in the pipe clamp and the linings can be formed of an elastic rubber with a friction limiting coating or a fire retarding material.

The first end region 1 of the locking mechanism extends circumferentially and has a free end. Spaced circumferentially from the free end is a radially outwardly extending projection 3 and its radial dimension decreases toward the free end of the first end region 1. Adjacent the free end, the first end region 1 has two shaped parts forming guides 6, 7. From the opposite outer sides of the first end region 1, the guides 6, 7 are first bent radially outward and then inward towards one another, note FIG. 3. As shown in FIG. 3, the free ends 8, 9 of the guides 6, 7 are spaced apart by a dimension A and the inner radially extending surfaces of the guides 6, 7 are spaced apart by a dimension B.

The second end region 2 of the locking mechanism extending circumferentially from its free end comprises a radially flexural locking strip 4 with an opening through the strip forming a stop face 5 directed away from the free end of the second end region. The radial dimension W of the guides 6, 7 of the first end region 1, note FIG. 3, is greater than the material thickness M of the second end region 2. The spacing or dimension A between the free end 8, 9 of the guides 6, 7 is greater than the width of the radially flexural locking strip 4 of the second end region 2. The dimension B between the inside facing surfaces of the guides 6, 7 extending parallel to a central axis of the pipe clamp corresponds essentially to the width of the first end region 1.

As shown in FIG. 2 illustrating the closed or locked position of the pipe clamp, the second end region 2 overlaps the first end region 1, however, the guides 6 and 7 of the first end region provide an overlap of the second end region at the opposite end from the free end. In addition to the locking strip 4, the second end region has a circumferentially extending section located within the guides 6, 7 with an end part sloping radially outwardly. After the projection 3 of the first end region 1 has passed under the locking strip 4 it becomes aligned with the opening in the second end region 2 and moves radially outwardly so that it bears against the stop face 5. In the closed or locked position shown in FIG. 2, the second end region 2 cannot move radially outwardly out of disengagement with the first end region, so that the pipe clamp remains in the locked position.

While a specific embodiment of the invention has been shown and described in detail to illustrate the inventive principles, it will be understood that the invention may be embodied otherwise without departing from said principles.

We claim:

1. A pipe clamp having a central axis, a first end region (1) and a second end region (2) each extending in the circumferential direction and each having a free end, an outside surface and an inside surface, said first end region comprises a projecting section (3) extending radially outwardly from the outside surface, said projecting section (3) has a radial dimension from the outside surface decreasing in the circumferential direction towards the free end of said first end region, said second end region comprises a radially flexural circumferentially extending locking strip (4) including a stop face (5) extending generally in the direction of the central axis and facing away from the free end of said second end region, said first and second end regions having an overlapping section extending in the circumferential direction, wherein the improvement comprises that said first end region in said overlapping section has two guides spaced apart in the direction of the central axis (6, 7) preventing radially outward movement of said second end region, wherein each of said guides is formed by a part bent radially outwardly from a side of said first end region and then bent inwardly extending generally parallel with the central axis, each of said parts having a free end (8, 9) facing one another, said free ends (8, 9) of said parts forming said guides (6, 7) are spaced apart by a dimension (A), said locking strip (4) having a width extending generally parallel to the central axis, and the dimension (A) between the free ends (8, 9) of said parts forming said guides (6, 7) is greater than the width of said locking strip (4).

2. A pipe clamp, as set forth in claim 1, wherein each of said guides (6, 7) is located along an opposite side of said first end region and extends radially outwardly from the outside surface of said first end region.

3. A pipe clamp, as set forth in claim 1 or 2 wherein said guides (6, 7) have an inside dimension (W) extending radially from the outside surface of said first end region (1) to an inside surface of said guides, said second end region has a thickness (M) in the radial direction, and said dimension (W) is greater than the material thickness (M) of said second end region (2).

4. A pipe clamp, as set forth in claim 1, wherein the parts of said guides extending inwardly slope from the free end of said first end region (1) inwardly towards the outside surface of said first end region (1).

5. A pipe clamp, as set forth in claim 1, wherein said locking strip (4) has an opening therethrough formed in part by said stop face (5) spaced from the free end of said second end region and arranged to receive said projection (3) in the locked position of said pipe clamp.

* * * * *